UNITED STATES PATENT OFFICE.

HARRY F. FRENCH AND RAYMOND C. BENNER, OF FREMONT, OHIO, ASSIGNORS, BY MESNE ASSIGNMENTS, TO NATIONAL CARBON COMPANY, INC., A CORPORATION OF NEW YORK.

PROCESS OF MAKING BATTERY-DEPOLARIZERS.

1,269,173. Specification of Letters Patent. Patented June 11, 1918.

No Drawing. Application filed November 21, 1916. Serial No. 132,556.

*To all whom it may concern:*

Be it known that we, HARRY F. FRENCH and RAYMOND C. BENNER, citizens of the United States, and residents, respectively, of Fremont, in the county of Sandusky and State of Ohio, and Fremont, in the county of Sandusky and State of Ohio, have invented a certain new and useful Improvement in Processes of Making Battery-Depolarizers, (Docket No. 268,) of which the following is a full, clear, and exact description.

This invention relates to electric batteries of the Lalande type. In this kind of battery copper oxid is used as the negative element and is opposed to a zinc electrode in an alkaline electrolyte, such as sodium or potassium hydroxid. In the application of Raymond W. Erwin, filed Nov. 30, 1915, Serial Number 64,342, means is disclosed for raising the voltage of this type of battery, consisting in the addition of sulfur to the copper oxid mass. We have found a new process for making a depolarizer for producing such an increase in voltage, as will now be set forth in detail.

We mix copper oxid or partially oxidized copper scale with sulfur and heat to such a temperature as will cause a reduction of the copper oxid either wholly or in part. There are a number of reactions that can take place, depending upon various conditions, such as temperature, time of heating, etc., and several of such reactions are given below:—

$$2CuO + S = SO_2 + 2Cu$$
$$4CuO + 3S = 2SO_2 + 2Cu + Cu_2S$$
$$4CuO + S = CuSO_4 + 3Cu$$

It is desirable to maintain conditions to produce the reducing reaction for the greater part in accordance with the first mentioned equation, as a large amount of cuprous sulfid ($Cu_2S$) is harmful to the cell. Copper sulfate ($CuSO_4$) should also be avoided as a high content of this material is harmful to the cell. The process, however, can be so controlled that but small amounts are formed; and in case of larger quantities one or two leaching operations are included in the later moistening process.

Our mixtures are made in the proportion of about 20 parts of sulfur to 80 parts (by weight) of copper oxid. It is permissible to reduce this sulful proportion according to the amount of metallic copper present in the starting material. We find that the proportion given is the optimum, although a high voltage depolarizer is obtained with amounts of sulfur as low as 3%.

The mixture is heated for several hours between 300° and 800° C. The reaction takes place very slowly, or not at all, below 300° and on the other hand there is danger of fusion if the material reaches too high of a temperature. A very satisfactory point is about 600° C. The heating should be conducted in a covered vessel nearly filled with material to avoid as far as possible the presence of air.

The roasted mass is then oxidized by moistening with water, or preferably with sodium hydroxid solution, and allowing it to stand in the air until oxidation is substantially complete.

It is not necessary to reduce the copper by sulfur alone. It is permissible to add less sulfur than that required and then complete the reduction by passing over the heated mixture some reducing agent, such as hydrogen, or other gas which may have the power of reducing the oxid of copper.

Also the sulfids of copper ($Cu_2S$, $CuS$, etc.) either natural or artificial, may be changed over into the high voltage depolarizer by roasting and then reoxidizing by means of air as previously described. This produces a depolarizer at low cost.

Having described my invention, what I claim is:—

1. The process of making a battery depolarizer which consists in reducing copper oxid with an excess of sulfur and then reoxidizing the reduced mass in the presence of the excess sulfur.

2. The process of making a battery depolarizer which consists in reducing copper oxid with an excess of sulfur, moistening the reduced copper and excess sulfur with sodium hydroxid solution, and then reoxidizing in the air.

In testimony whereof, we hereunto affix our signatures.

HARRY F. FRENCH.
RAYMOND C. BENNER.

Copies of this patent may be obtained for five cents each, by addressing the "Commissioner of Patents, Washington, D. C."